No. 760,237. PATENTED MAY 17, 1904.
L. G. NILSON.
VEHICLE TIRE.
APPLICATION FILED OCT. 3, 1903.
NO MODEL. 2 SHEETS—SHEET 1.
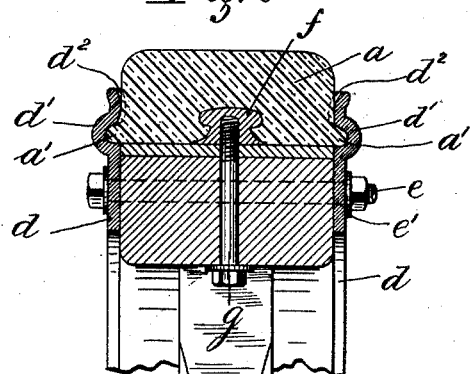
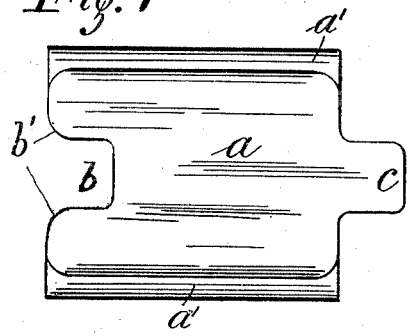
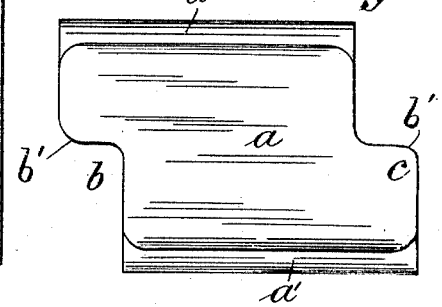
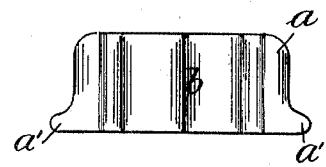
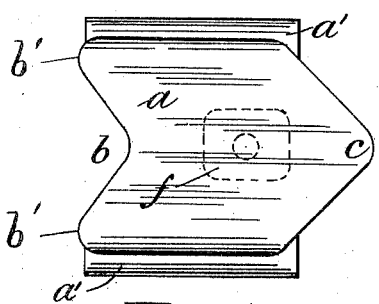
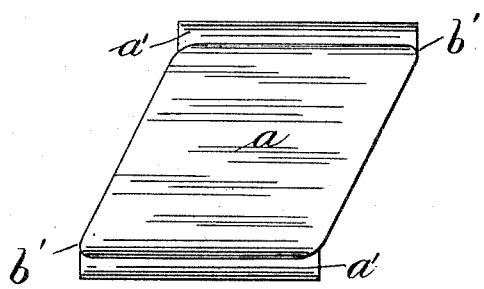
Witnesses
Lars G. Nilson, Inventor
By his Attorney C. N. Edwards No. 760,237. PATENTED MAY 17, 1904.
L. G. NILSON.
VEHICLE TIRE.
APPLICATION FILED OCT. 3, 1903.
NO MODEL. 2 SHEETS—SHEET 2.
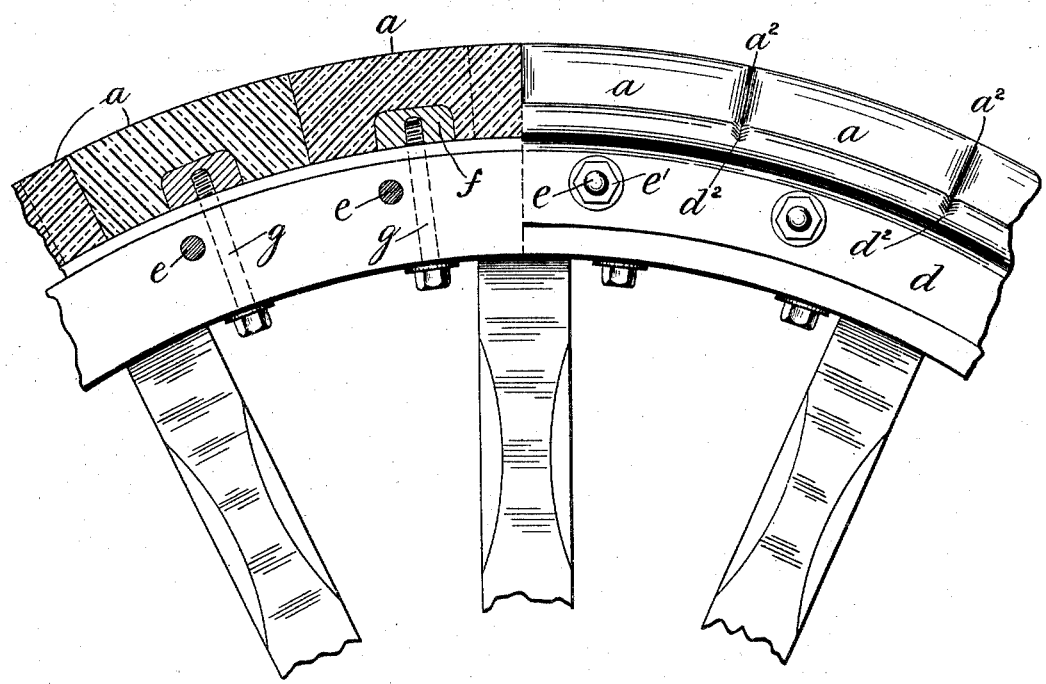
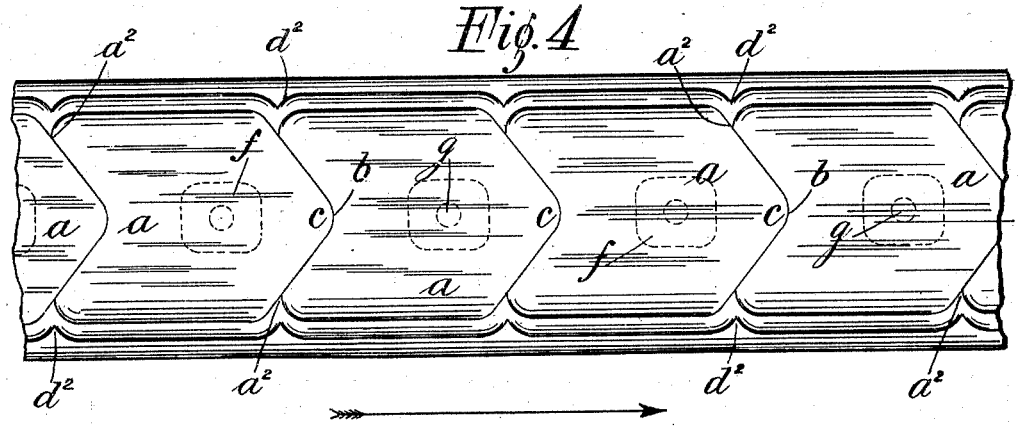

No. 760,237. Patented May 17, 1904.

UNITED STATES PATENT OFFICE.

LARS GUSTAF NILSON, OF NEW YORK, N. Y., ASSIGNOR OF TWO-THIRDS TO SIEGFRIED M. FISCHER AND HARRY S. FISCHER, OF NEW YORK, N. Y.

VEHICLE-TIRE.

SPECIFICATION forming part of Letters Patent No. 760,237, dated May 17, 1904.

Application filed October 3, 1903. Serial No. 175,537. (No model.)

*To all whom it may concern:*

Be it known that I, LARS GUSTAF NILSON, a citizen of the United States of America, residing at 76 Lexington avenue, New York, in the county of New York and State of New York, have invented certain new and useful Improvements in Vehicle-Tires, of which the following is a full, clear, and exact specification.

This invention relates to vehicle-tires, and more particularly has reference to tires for heavy self-propelled vehicles—such as omnibuses, drays, &c. In vehicles of this type, on account of the great weight on the wheels, the tires necessarily have to be made solid and very heavy. It has been found that the solid tires as generally constructed become damaged at the points where secured to the rim before becoming damaged on the tread. This is due to the tendency of all tires to creep in spite of the various forms of fastenings and also to the varying amounts of compression and the lateral strains in going around corners. It also happens that the tire wears faster in some places than it does in others or becomes damaged by running over some sharp object. In the cases where continuous solid tires are used these injuries necessitate the replacement of the entire tire. Another objection to the use of continuous solid tires is that after having been in use some time they stretch and become larger than the wheel. In this case the tire becomes useless, as it cannot be securely attached, and must be entirely removed and shortened.

The object of this invention is to provide an improved form of sectional tire with improved means for fastening the sections to the wheel so that the tendency to creep will be obviated and still permit easy removal of damaged sections.

A still further object of the invention is to provide a tire having a greater tractive power and at the same time improve the form of joints between the sections so that bits of material, such as sand or gravel, will not be picked up either when moving straight ahead or when slipping laterally.

The invention will be more particularly described in connection with the accompanying drawings, in which—

Figure 1 is a plan view showing one of the tire-sections detached. Fig. 2 is a side elevation. Fig. 3 is an end elevation. Fig. 4 is a plan view of a portion of the tire according to this invention. Fig. 5 is a side view partly in section. Fig. 6 is a transverse section showing the method of attaching the sections to the rim, and Figs. 7, 8, and 9 are plan views showing the tire-sections having differently-shaped ends.

$a$ represents the segmental or sectional blocks or pieces of which my improved tire is composed. Each block $a$ is preferably formed as shown in Figs. 1, 2, and 3—that is to say, each block is similar to each other block—and is provided at one end with a V-shaped recess $b$, having rounded corners $b'$. At the other end it is pointed, as at $c$, so as to fit into the recess $b$ of the next block. Along the base of each block at the sides are provided longitudinal ribs $a'$, which engage with the flanges of the rim $d$, as shown in Fig. 6.

The object of providing the interlocking or dovetail joints between the sections is to prevent the joints from opening up and admitting sand or other matter, as would be the case if the joints were formed straight across at right angles to the rim. This would especially be likely to happen where the wheel skids, as in going around a corner. The sections should preferably be placed with the apexes pointing in the direction of motion, as shown in Fig. 4 by the arrow.

$d\ d$ are segmental plates which are clamped to the sides of the fellies by bolts and nuts $e\ e'$, as shown in Figs. 5 and 6. The segmental plates $d$ are provided with recesses $d'$ to receive the ribs $a'$ of the tire sections or blocks $a$. The plates $d\ d$ also have inward projections $a^2$, as shown in Figs. 4 and 5, which fit in the spaces formed by the rounded corners of the blocks. $d^2$ indicates a depression in the plates corresponding to the projections $a^2$. By this construction it will be seen that each block is clamped, so that it cannot move outward or longitudinally. To reduce the strain on the plates or flanges $d$, an additional fastening means is provided by means of the nut $f$, which is embedded in the sections, and the bolt $g$, which passes radially through the felly and engages the nut $f$. Where large sections are used, it might be advisable to use more than one nut in each block, though generally one will be found sufficient.

Figs. 7, 8, and 9 show blocks having different ends, but embodying the same principles of construction. In Fig. 7 the dovetails are substantially rectangular in form instead of being pointed, as in Fig. 1. In Fig. 8 the dovetail is at one side instead of in the middle. In Fig. 9 the ends of the sections are straight, but are inclined to the plates $d$. In all of these cases the joints will tend to close up and remain so, because the entire joint does not engage with the ground at the same time, as would be the case if the joint were at right angles to the rim.

It is obvious that the flanges $d$ may be made continuous, so as to form rings, if desired. In practice, however, it is generally found advisable to form flanges $d$ in segments, so that should it be necessary to replace one or more of the sections it can be done without removing the entire flange. The indentations caused by the round corners of the sections, in addition to the function of holding the sections against longitudinal movement, increase the tractive power of the tire and enable obstacles to be more easily overcome. It will be seen that in case of the block being very large it might be advisable to provide additional indentations $a^2$ in the flanges to engage with the blocks between their ends.

From the foregoing description it will be seen that I have provided a tire of increased tractive power which may be very securely attached to the rim and which will not be liable to creep.

Modifications and changes may be made without departing from the scope of the invention, and I do not desire to be limited to the exact construction which I have shown.

Having thus described my invention, I declare that what I claim as new, and desire to secure by Letters Patent, is—

1. The combination with a rim, of a tire composed of sections, said rim having teeth extending radially and projecting between the joints in the sections, substantially as described.

2. The combination with a rim, of a tire composed of ribbed abutting sections, said rim having channels engaged with said ribs, and having projections extending between the joints in the sections the projections on one side being independent of those on the other, substantially as described.

3. The combination with a felly having a sectional tire, of a rim composed of segments having radially-extending teeth, said teeth being adapted to retain the tire-sections against movement, the segments being independently fastened to the felly, substantially as described.

4. In a vehicle-tire, the combination with a felly carrying a tire-section, of a grooved rim clamping the section on its sides and having projections engaging the section at its ends, the projections on one side being independent of those on the other side of the rim, substantially as described.

5. In a vehicle-tire, the combination with a felly carrying a tire-section, of a rim attached to the felly and clamping the section on its sides, and having projections engaging the sections the projections on one side being independent of those on the other, substantially as described.

6. The combination with a felly having a tire composed of mutually-interlocking sections, of segments holding the sections in place and having projections extending between adjacent sections, said segments being independently attached to the felly, substantially as described.

7. The combination with a rim, of a tire composed of sections having rounded corners, said rim having teeth extending outwardly and projecting into the recesses formed by the rounded corners, substantially as described.

8. The combination with a rim, of a tire composed of sections having rounded corners, teeth on said rim extending outwardly and projecting into the recesses formed by the rounded corners, the joints between said sections meeting in other than a straight line at right angles to the plane of the wheel, substantially as described.

9. The combination with a rim, of a tire composed of sections having rounded corners, teeth on said rim extending outwardly and projecting into the recesses formed by the rounded corners, the joints between said sections extending radially of the wheel and meeting in other than a straight line at right angles to the plane of the wheel, substantially as described.

10. The combination with a felly, of a tire composed of sections, independent means in each section engaging the felly, for fastening the sections thereto, a rim attached to the felly and engaging the sides of the sections, and means on the rim holding the sections against longitudinal movement, substantially as described.

11. The combination with a felly, of a tire composed of wedge-shaped, interlocking sections, and independent means for fastening each section to the felly, substantially as described.

12. The combination with a felly, of a tire composed of sections, independent means in each section engaging the felly, for fastening the sections thereto, a segmental rim attached to the felly and engaging the sides of the sections, and means on the rim holding the sections against longitudinal movement, substantially as described.

13. The combination with a felly, of a tire composed of sections, independent means in each section engaging the felly, for fastening the sections thereto, a rim attached to the felly and engaging the sides of the sections, and means on the rim projecting partially between adjoining sections for holding them against longitudinal movement, substantially as described.

14. The combination with a felly, of a tire composed of interlocking sections, independent means in each section engaging the felly, for fastening the sections thereto, a rim attached to the felly and engaging the sides of the sections, and means on the rim projecting partially between adjoining sections for holding them against longitudinal movement, substantially as described.

15. The combination with a felly, of a tire composed of a series of resilient blocks, each block being wedge-shaped at one end and interlocking with the adjacent block, the blocks when assembled forming a continuous tread, and means for fastening the blocks directly to the felly, substantially as described.

16. The combination with a felly, of a tire composed of blocks of resilient material, the joints between the blocks meeting in other than a right angle to the plane of the wheel, and means for fastening each section directly to the felly, whereby a continuous tread is formed, substantially as described.

17. The combination with a felly, of a tire composed of blocks of resilient material, the joints between the blocks meeting in other than a right angle to the plane of the wheel, and independent means for fastening each section directly to the felly, whereby a continuous tread is formed, substantially as described.

In testimony whereof I affix my signature in presence of two witnesses.

LARS GUSTAF NILSON.

Witnesses:
John Henry Bishop,
E. Lade.